United States Patent
Puri et al.

(10) Patent No.: US 7,895,513 B1
(45) Date of Patent: Feb. 22, 2011

(54) COLOR REDUCTION IN COMPLEX FIGURES CONTAINING TEXT FOR SPACE/TIME CONSTRAINED PLATFORMS

(75) Inventors: Atul K. Puri, Delhi (IN); Susanta Sarkar, Noida (IN); Ajay Pande, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1006 days.

(21) Appl. No.: 10/447,718

(22) Filed: May 28, 2003

(51) Int. Cl.
*G06F 17/30* (2006.01)
*G06F 17/15* (2006.01)

(52) U.S. Cl. .................. 715/234; 715/238; 715/239; 715/242; 715/255; 715/256; 715/273; 715/269

(58) Field of Classification Search ............... 715/513, 715/744, 204, 242, 234, 256, 269, 273, 255; 345/428, 600
See application file for complete search history.

(56) References Cited

U.S. PATENT DOCUMENTS

| | | | | |
|---|---|---|---|---|
| 5,864,342 A * | 1/1999 | Kajiya et al. | ............... | 345/418 |
| 6,563,517 B1 * | 5/2003 | Bhagwat et al. | ............. | 715/735 |
| 6,563,964 B1 * | 5/2003 | Hallberg | ............. | 382/299 |
| 6,628,300 B2 * | 9/2003 | Amini et al. | ............. | 345/660 |
| 6,633,314 B1 * | 10/2003 | Tuli | ............. | 715/744 |
| 6,704,024 B2 * | 3/2004 | Robotham et al. | ............. | 345/581 |
| 6,955,298 B2 * | 10/2005 | Herle | ............. | 235/472.01 |
| 6,975,982 B1 * | 12/2005 | Guenther | ............. | 704/1 |
| 7,130,474 B2 * | 10/2006 | Luo et al. | ............. | 382/239 |
| 7,222,306 B2 * | 5/2007 | Kaasila et al. | ............. | 715/801 |
| 2002/0036788 A1 * | 3/2002 | Hino | ............. | 358/1.11 |
| 2002/0097419 A1 * | 7/2002 | Chang et al. | ............. | 358/1.13 |
| 2004/0095587 A1 * | 5/2004 | Brown et al. | ............. | 358/1.2 |
| 2004/0113927 A1 * | 6/2004 | Quinn et al. | ............. | 345/700 |

OTHER PUBLICATIONS

Smith et al, "Scalable Multimedia Delivery for Pervasive Computing", Oct. 1999, pp. 131-140.*
Sugita, Hiroaki, et al., "JPEG2000 High-Speed Progressive Decoding Scheme," pp. III-873-6 vol. 3, Proceedings of the 2004 International Symposium on Cirsuits and Systems, 2004. ISCAS '04.
Rabbani, Majid, "JPEG-2000: Background, Scope, and Technical Description," Eastman Kodak Company, Dec. 1998, 44 pages.
"How to Create Accessible Adobe PDF Files," 2001, Adobe Systems Incorporated.
"Pliable Display Technology <PDT> Technical Description v2.0," IDELIX Software, Inc., Mar. 2002.

* cited by examiner

*Primary Examiner*—Stephen S Hong
*Assistant Examiner*—Wilson Tsui
(74) *Attorney, Agent, or Firm*—Fish & Richardson P.C.

(57) ABSTRACT

Methods and apparatus, including computer program products, for configuring an electronic document for a presentation environment, where the electronic document includes a plurality of information types. A display constraint for the presentation environment is determined based on text information in the electronic document. A size of an electronic document is calculated under a first set of conditions satisfying the display constraint. A determination is made whether the calculated size satisfies a processing constraint of the presentation environment. If the calculated size does not satisfy the processing constraint, a reduced representation of the electronic document is configured by reducing information of a secondary information type of the electronic document, such that the reduced representation satisfies both the display constraint and the processing constraint and retains spatial relationships of the text information in the electronic document.

12 Claims, 4 Drawing Sheets

COLOR REDUCTION IN COMPLEX FIGURES CONTAINING TEXT FOR SPACE/TIME CONSTRAINED PLATFORMS

BACKGROUND OF THE INVENTION

The present invention relates to electronic documents.

Electronic documents can be displayed on many different types of electronic devices. Electronic documents can be stored for display in many formats, and can be stored and/or displayed at different levels of resolution. The techniques used to display level of resolution can depend on the available storage and/or the processing power. For example, a technique for displaying rich text documents that combine text and graphics is to render them using vector graphics. Rendering using vector graphics includes non-trivial computing, which may not be efficient on low power devices. Another technique is to convert the document into a raster image. A raster image includes a collection of individual pixels, one pixel for each point on a computer screen. Raster images can have storage requirements that are too high for limited storage devices.

Handheld devices are one category of electronic devices that can be used to store and display electronic documents. Typical handheld devices are constrained in both the amount of memory available and processing power—for example, some handhelds have as little as 2 megabytes of internal memory and processor speeds as low as 16 megahertz. Documents can be loaded on to handheld devices from computers or other devices. For example, a document can be loaded on to a handheld device through a desktop application of a computer. The desktop application configures a document, if necessary, for viewing and storage in a handheld device. The configured document is transmitted to the handheld device through a synchronization interface for the handheld, such as a HotSync™ interface distributed by Palm, Inc. of Milpitas, Calif. Then, the transferred document can be viewed in the handheld.

SUMMARY OF THE INVENTION

The invention provides methods and apparatus for storing and displaying rich text documents in a manner that best preserves the characteristics of high-priority information types of the documents, such as the legibility of text, while minimizing the memory and processing power dedicated in the process.

In general, in one aspect, the invention features methods and apparatus, including computer program products, implementing techniques for configuring an electronic document for a presentation environment, where the electronic document includes a plurality of information types. The techniques include determining a display constraint for the presentation environment based on text information in the electronic document, calculating a size of an electronic document under a first set of conditions satisfying the display constraint, and determining whether the calculated size satisfies a processing constraint of the presentation environment. If the calculated size does not satisfy the processing constraint, a reduced representation of the electronic document is configured by reducing information of a secondary information type of the electronic document, such that the reduced representation satisfies both the display constraint and the processing constraint and retains spatial relationships of the text information in the electronic document.

Particular implementations can include one or more of the following features. Determining a display constraint can include determining a resolution threshold at which text is legible in the presentation environment. The resolution threshold can be calculated according to the formula $$dDPI = sDPI \times dFontSize / sFontSize$$

where dDPI is the resolution threshold, sDPI is a standard resolution of the electronic document, dFontSize is the size of a standard font size in the first device, and sFontSize is the smallest font size of the one or more text objects in the electronic document. sDPI can include a standard resolution of a computer monitor.

The secondary information type can include color, and configuring a reduced representation of the electronic document can include reducing a color space of the electronic document. The processing constraint can include a memory constraint or a processing constraint. Configuring an electronic document can include converting the electronic document from a first format to a second format for the presentation environment. The second format can include a bitmap. A plurality of display constraints can be determined such that each display constraint is based on a portion of the electronic document. At least two of the plurality of portions can overlap.

The invention can be implemented to realize one or more of the following advantages. Information types in an electronic document can be prioritized, such that when the document is to be converted to another format, a minimum characteristic of higher priority information types is maintained or expanded while a characteristic of lower priority information types is reduced to meet memory or time constraints of a device on which the converted image is to be stored or displayed. For example, rich text documents can be configured for storage and display on handheld devices in a way that minimizes the document size and processing requirements while preserving the legibility of text in the document. Thus, text information, including spatial relationships of the text information, is preserved in the other format while other information is filtered out as necessary.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

A technique for converting an image for storage and/or display in a presentation environment includes determining a desired display constraint for one or more high priority information types of at least a portion of an electronic document to be configured for display in the presentation environment, and reducing characteristics of one or more lower priority information types of the electronic document until one or more processing constraints of the presentation environments are satisfied. A presentation environment can include an environment where display of a particular document type is constrained for any reason, such as, for example, limited storage or limited power. A processing constraint can include a limitation on storage space or processing time. Information types can include, for example, text information such as typeface, character codes, glyphs, font size, etc., color information, such as color values and the size of the color space of a document, and vector graphics. In one implementation, the high priority information types include text, while the lower priority information types include color. In this implementation, a display constraint for the electronic document is determined based on a characteristic, such as minimum font size, of text in the portion of the electronic document. Priorities can be assigned to information types based on the type of document such that document information types will be prioritized similarly for similar types of documents. Priorities can also be assigned for different information types based on the environment in which the document is to be displayed, such as a handheld device, for example. Priorities can be assigned to information types automatically—for example, based on a predetermined priority hierarchy implemented in a document conversion application—or by a user of a desktop application, a designer or administrator of the desktop application, or a designer or administrator of a stand alone document conversion application. The determination of priority can be a subjective determination.

An electronic document does not necessarily correspond to a file. A document may be stored in a portion of a file that holds other documents, in a single file dedicated to the document in question, or in a set of coordinated files.

Figure 1:
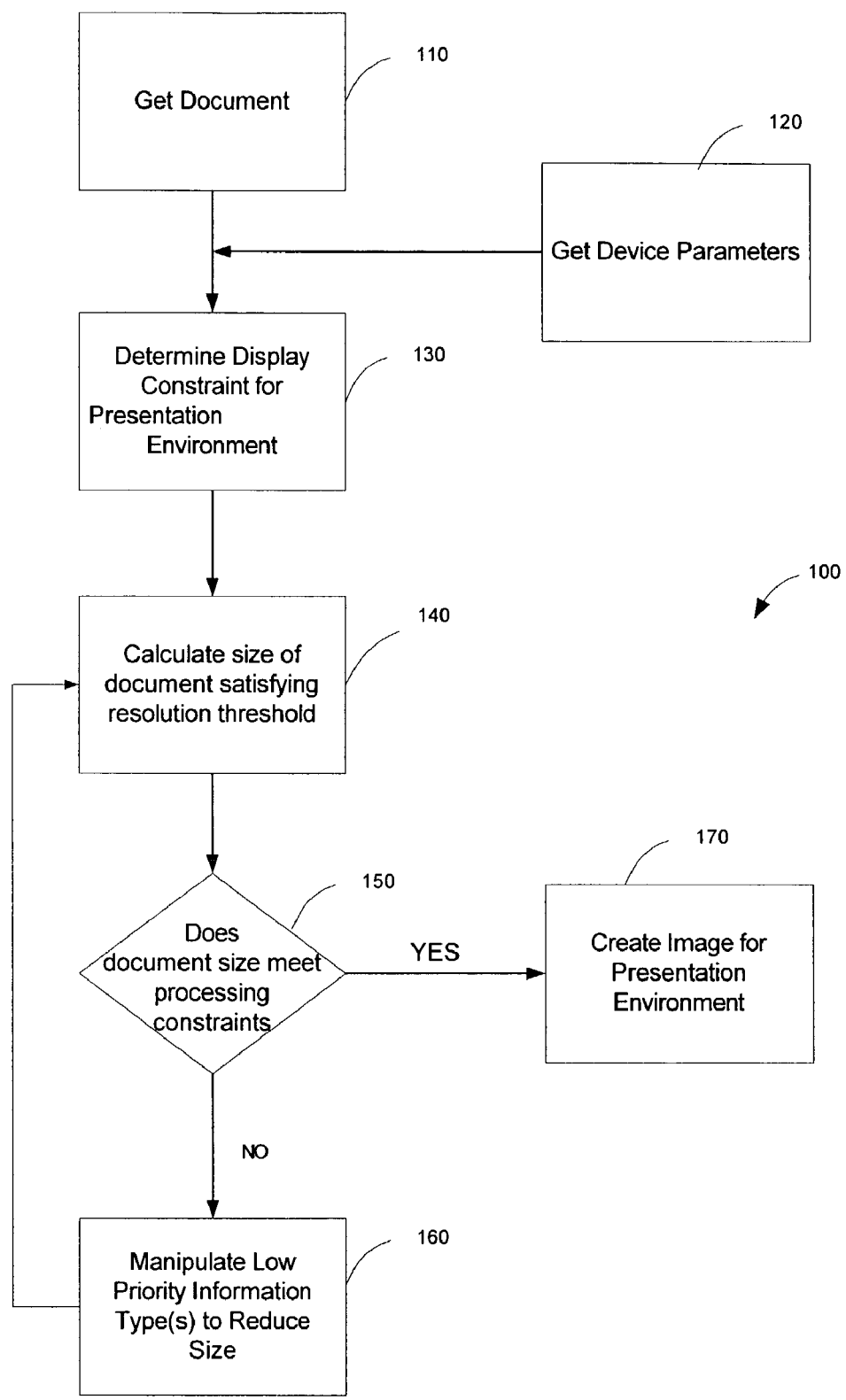
FIG. 1 is a flow diagram illustrating a method of configuring an electronic document for a constrained device.

FIG. 1 is a flow diagram illustrating a method 100 of configuring an electronic document for use in a presentation environment. A configuration application initiates the configuration method by getting a document to be configured for the presentation environment (step 110). The electronic document can include rich text documents that include text and line art, graphics or images, such as maps, photographs, and the like. The text can include text incorporated in graphics, figures or the like, in which the text has a defined set of spatial relationships with other elements of the electronic documents. The presentation environment can be a low storage and/or a low power environment. The presentation environment can include a device, such as a handheld device or a digital camera, an application running in a computer, or a computer system.

The configuration application then gets device parameters for the presentation environment (step 120). The device parameters include information necessary to determine a display constraint for the configured electronic document and the presentation environment. For example, the device parameters can include the size of a viewing area of the presentation environment, the standard screen resolution of the presentation environment, a standard font size of the presentation environment, the number of colors supported in the presentation environment, storage space of the presentation environment, and processing time requirements of the presentation environment.

The configuration application determines a display constraint for the electronic document (step 130). In one implementation, the display constraint represents a minimum viewing level, such as legibility of the smallest font size text, that is desired for viewing the electronic document in the presentation environment. The display constraint can include, for example, a resolution threshold. The display constraint is determined based on the content of at least a portion of the electronic document (the "portion of interest") that is to be configured for the presentation environment. A portion of interest is defined by a user. The display constraint for the portion of interest is determined by examining high priority information types in the portion of interest, and determining what resolution is required for the high priority information types in the presentation environment. The display constraint is based on the device parameters of the presentation environment. For example, the configuration application can be configured to determine a minimum viewability characteristic of the high priority information type(s), such as text, based on ratios of the viewing area of the presentation environment to the size of an information type, such as a font size. The configuration application can determine what information in the portion of interest is of the high priority information type, and determine the minimum viewability characteristics based on the determined high priority information. The configuration application can determine what information is of the high priority information type using known techniques. For example, the configuration application can examine regional markings, such as tags, in the portion of interest that are associated with information in the portion of interest and label the information by type. Appropriate tags can be inserted into the electronic document for this purpose using known techniques.

In another example, a user can be presented with a simulation of the display in the presentation environment, and the user can select the minimum viewability characteristic for the high priority information type. When the minimum viewability characteristic has been determined, the display constraint can be calculated by multiplying a display characteristic of the document in its current environment by a ratio of the determined minimum viewability characteristic of the high priority information type in the presentation environment to a characteristic of the high priority information type in the current environment. An example of this calculation is given in the description of FIG. 4. In one implementation, the display constraint is, a storage resolution threshold, representing the resolution at which the electronic document will be stored in the presentation environment. This can represent the resolution of the document at a 100% zoom level.

The portion of interest can correspond to the entire electronic document, so that just a single display constraint is determined for the electronic document. Alternatively, different display constraints can be defined for different portions of interest (i.e., different portions of the electronic document to be configured for the presentation environment) within a single electronic document. The different portions of interest in the document can overlap. For example, different portions of interest can be selected from one document for viewing in the presentation environment, each of the different portions of interest can be converted to a format at different resolutions for viewing in the presentation environment, and then the converted portions of interest can be linked together.

The size of a document satisfying the display constraint is calculated (step 140). The size of the document satisfying the display constraint is calculated by calculating the size of a document that can be created with the set information type characteristics. The set information type characteristics include the high priority information type(s) set at the minimum viewability characteristic(s) and all other information types set at the characteristics of the original electronic document. For example, if the high priority information type is font size, and the other information types include color values, the font size used to calculate the size of the document satisfying the display constraints will be the calculated minimum viewability size, and the color values used will be the same as the color values in the original electronic document. The calculated document size is compared to a predetermined set of processing constraints to determine if the processing constraints are satisfied (step 150). The processing constraint can include a size limit that is determined based on storage capacity and time constraints associated with the presentation environment. For example, it may be desirable to limit the configured document to a specified size (e.g., 500 kilobytes) or to a size that can be rendered in a specified time (e.g., in under 30 seconds). The processing constraints can be determined based on the device parameters of step 120. For example, the processing constraints can include a size limit set to 20% of the total storage capacity of the presentation environment.

If the processing constraints are not satisfied (the "NO" branch of step 150), lower priority information types of the electronic document can be manipulated to reduce the size of the configured document (step 160). Manipulating information types can include reducing characteristics, such as size or quantity, of the information types. For example, the characteristics of a low priority information types can be reduced to reduce the size of the configured document. Thus, the set characteristics of the low priority information types become the characteristics resulting from the manipulation.

The size of the reduced document (i.e., a version of the electronic document configured according to the manipulated lower priority information types) is calculated in step 140, and the calculated size is again be compared to the processing constraints in step 120 to determine if the reduced document satisfies the processing constraints. Steps 140, 150 and 160 are repeated until the processing constraints are satisfied (the "YES" branch of step 150). The configuration application can also provide a hierarchy of lower priority information types. If the size limit is not met by manipulating the lowest priority information type, the next lowest information type is manipulated, and so on until the processing constraints are met.

Once the processing constraints are satisfied, the electronic document is configured according to the final characteristics determined for the information types for the presentation environment (step 140). The configured document can be in a different format than the format of the original electronic document, such as a format native to the presentation environment. For example, the original electronic document can be converted to a bitmap using known techniques. The conversion of the electronic document to a bitmap preserves layout and spatial relationships of the information in the electronic document. Coding information can be retained and associated with (e.g., hidden behind) the bitmap as described in "Method and Apparatus for producing a Hybrid Data Structure for Displaying a Raster Image," U.S. Pat. No. 5,625, 7111, and "Method and Apparatus for producing a Hybrid Data Structure for Displaying a Raster Image," U.S. Pat. No. 5,729,637, both of which are incorporated by reference. The configured document can be stored and/or displayed in the presentation environment.

Figure 2:
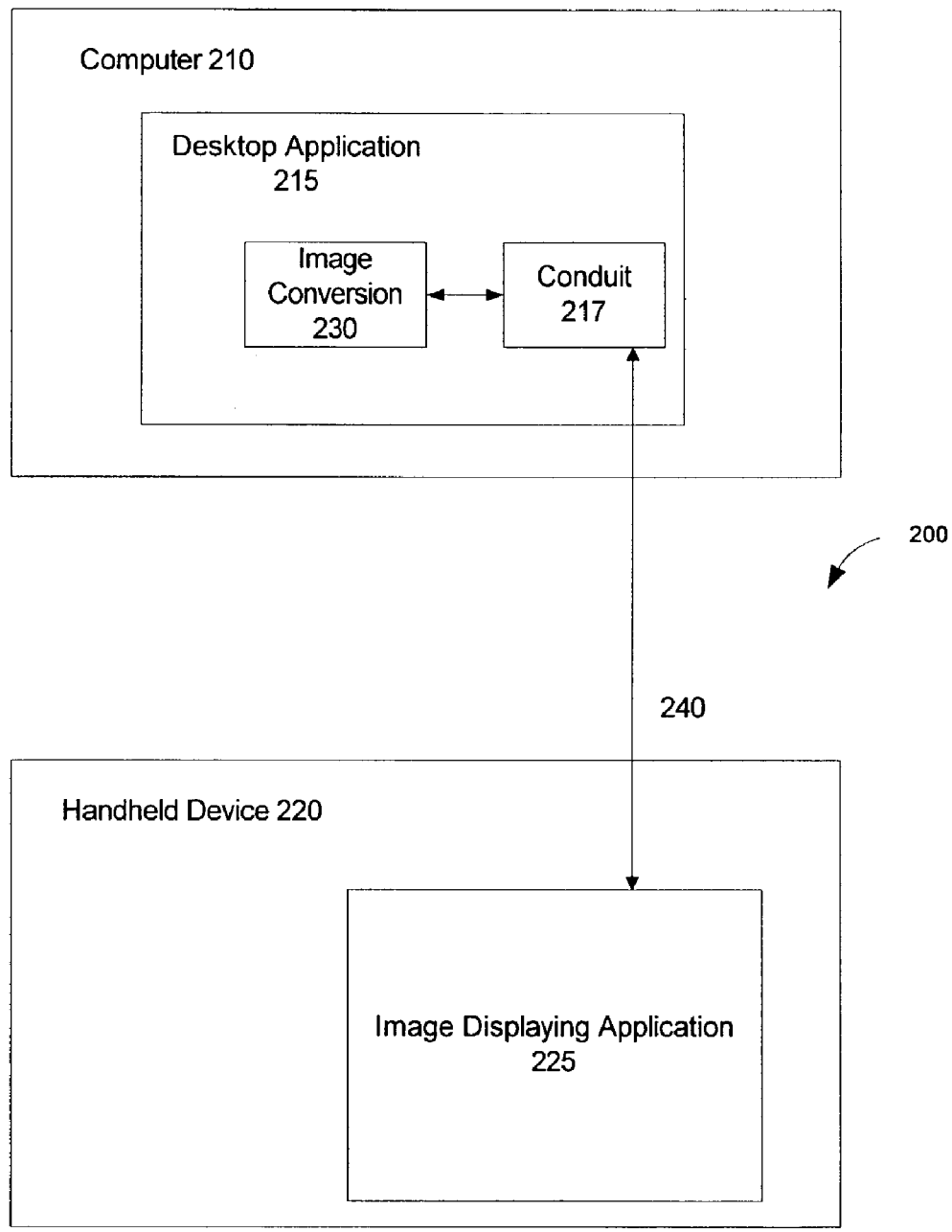
FIG. 2 is a block diagram of a system for configuring an electronic document for storage and display on a constrained device.

The method 100 will be described in more detail in the context of the specific example of transferring a portable document format ("PDF") document including text and non-text information types from a desktop application to a handheld device. FIG. 2 is a block diagram illustrating a system 200 for configuring an electronic document on a computer 210 for viewing on a handheld device 220. Computer 210 can include any computer or system capable of running software applications. Handheld device 220 can include a variety of portable devices such as personal digital assistants ("PDAs) or wireless communication devices.

A desktop application 215 running on computer 210 includes a conduit application 217 for transferring a document from computer 210 to handheld device 220. The conduit 217 implements synchronization logic between desktop application 215 and handheld device 220. Conduit 217 can coordinate with an document configuration application 230, which configures a document on computer 210 for storage and viewing on handheld 220. The conduit 217 transfers the configured PDF document to handheld device 220. Although the document configuration application 230 is described with reference to desktop application 215, the document configuration application can reside partially or fully in the handheld device, in an intermediate device located between computer 210 and handheld device 220, or in a remote device such as a server.

Handheld device 220 includes a document display application 225 for displaying the document received from the computer 210. Handheld device 220 typically includes a screen for displaying images that is smaller than a display screen of computer 210. The handheld device 220 can also have lower power and limited storage capacity in comparison to computer 210.

Desktop application 215 and document display application 225 can be connected through an interface 240. An example of such an interface is the HotSync™ interface. The computer 210 can also include an Adobe® Acrobat® plug-in application (not shown) and an Acrobat® Reader™ plug-in application (not shown). Each plug-in application allows a user to transfer a currently active PDF document or e-book in Acrobat® or Acrobat® Reader™ to a handheld device 220.

In the example of transferring a PDF document to a handheld device, the document display application 225 can include the Acrobat® Reader™ for Palm™ OS™ application distributed by Adobe Systems Incorporated of San Jose, Calif. To display a PDF document on screens of different sizes, such as a handheld screen, tags can be defined in the PDF document. The tags define structure and function of the document, and allow elements of the document to be reflowed (i.e., the reading order of text is preserved regardless of screen size).

Desktop application 215 can include a converter dynamic link library ("DLL") and a user interface that runs above the converter DLL. The converter DLL can tag a PDF file and convert it into a format suitable for viewing in the Acrobat™ Reader™ for Palm™ OS™ application. For example, for some document information types, e.g., vector graphics, images can be converted into raster images for viewing in the handheld.

Figure 3:
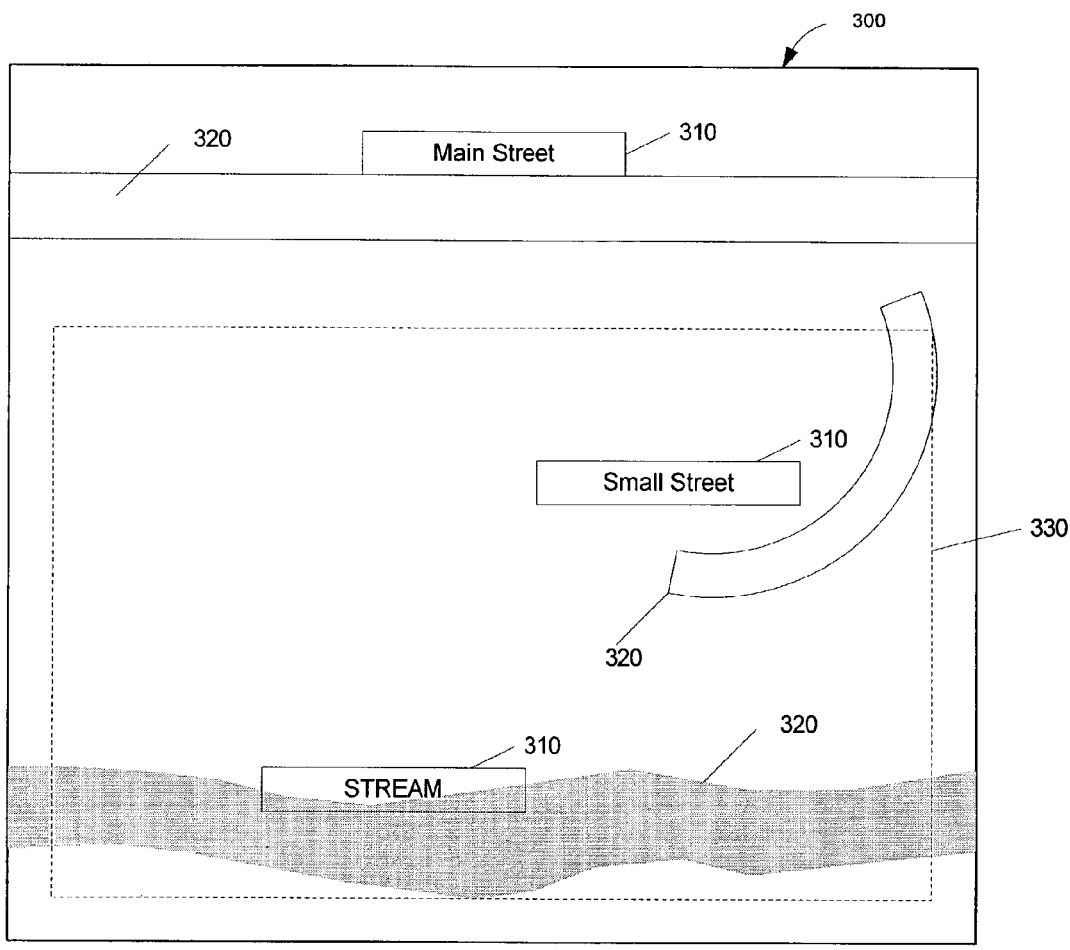
FIG. 3 illustrates an exemplary electronic document to be displayed on a constrained device.

FIG. 3 illustrates one example of a rich text document—a map 300—that a user might want to view on a handheld device. The map 300 includes text information 310 and non-text information, such as the representations 320, of the streets and stream. Some or all of these information types have associated color information defining colors in a color space of the document in which the information types will be displayed. Region 330 represents a portion of interest that has been identified in map 300. The portion of interest 330 can be identified, for example, by a user through the user interface of desktop application 210, representing a region that the user would like to view in handheld device 210.

The map can be stored in an electronic document, such as a PDF document. For the map 300, text has been designated high priority information type while color (not shown) has been designated low priority information type.

Figure 4:
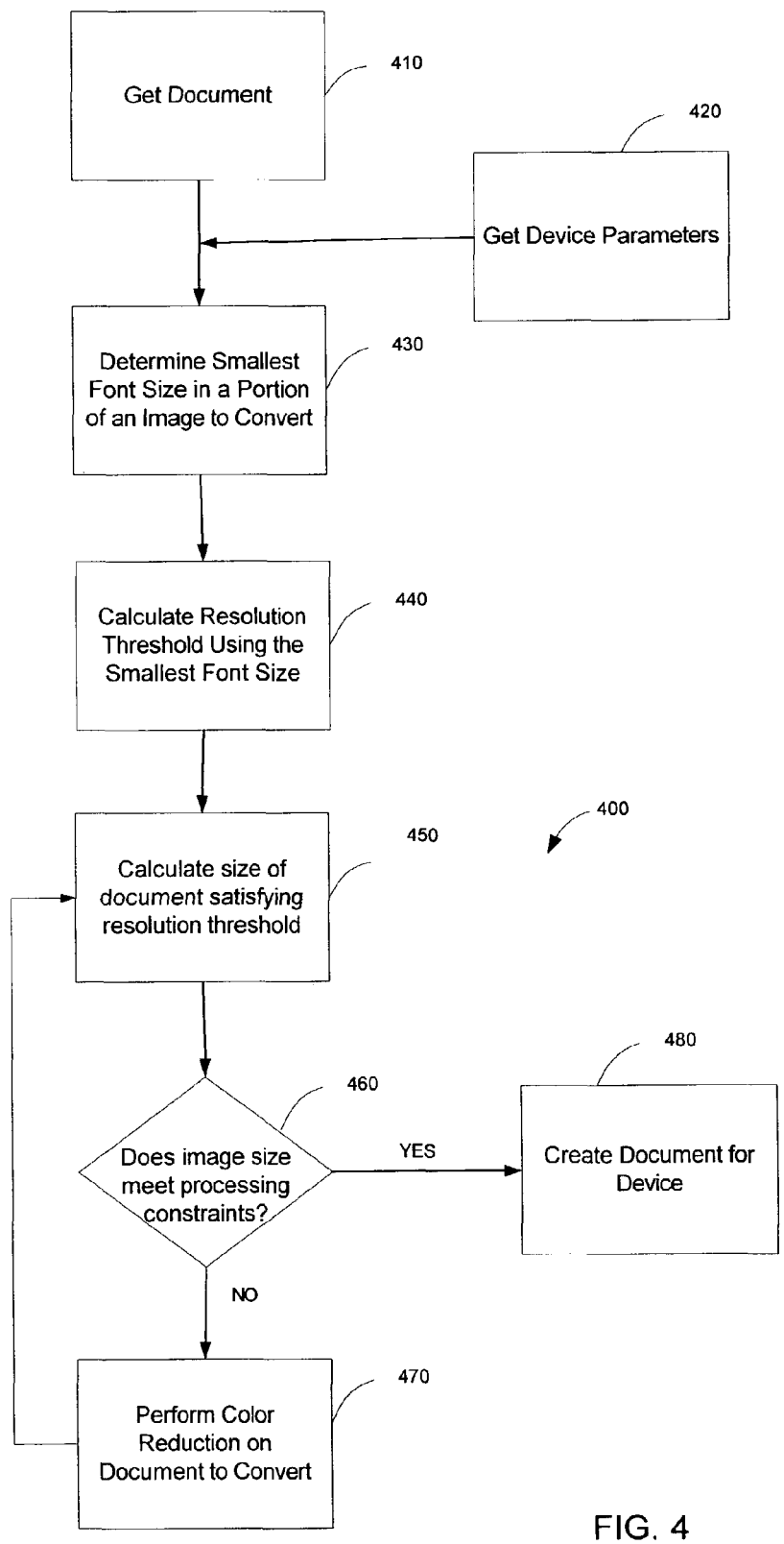
FIG. 4 is a flow diagram illustrating a method of configuring a rich text electronic document for a constrained device.

Map 300 can be configured for viewing in handheld 220 using a method 400, illustrated in FIG. 4. The method 400 can be initiated by a user through desktop application 210. The method begins by getting an electronic document to be stored and/or displayed in handheld 220 (step 410). The user can select a document through desktop application 210. In the example, a user selects map 300 through desktop application 210 to be configured for viewing in the handheld 220.

The configuration application gets device parameters for the handheld device (step 420). Because text information has been designated as high priority in this example, all text information located in the portion of interest is examined to determine the resolution threshold for the portion of interest, which in this example corresponds to the resolution at which text in the portion of interest would be legible. The document configuration application 230 determines the smallest font size in the portion of interest 330 by examining all text information 310 in the portion of interest 330 (step 430). Text information can be identified based on tags associated with the information types in desktop application 210. Legibility can be determined based on a known display resolution of handheld device 220 by determining which text element(s) has the smallest font size in the portion of interest, and determining at what font size of the handheld 220 the text element(s) having the smallest font size would be legible. For example, the configuration application can be configured to calculate the legible font size for the handheld, or a user can select the font size that will be legible in the handheld 220 through desktop application 210.

The resolution threshold is calculated using the smallest font size (step 440). The resolution threshold for the handheld 220 can be calculated using the formula:

$$dDPI = sDPI \times dFontSize / sFontSize$$

where dDPI is the resolution threshold, sDPI is a standard resolution of the electronic document, dFontSize is the legible font size in the handheld 220, and sFontSize is the smallest font size of the text information in the portion of interest 330. The value for sDPI can be set to 72 dots per inch ("dpi"), the value of the standard resolution for a computer monitor. For example, if the smallest font size in the portion of interest is 5 point font and the smallest viewable font size in the handheld 220 is 11 point font, resolution threshold (dDPI) for map 300 to be viewed in handheld 220 is calculated to be 158 dpi.

The resolution threshold can also be determined using the formula:

$$dDPI = sDPI \times K(dFontSize) / sFontSize,$$

where K is a factor for increasing the minimum font size for an image created for viewing on handheld 220.

The configuration application 230 determines the size of the document that can be created at the resolution threshold and using the characteristics of the information types (step 450). The configuration application then determines if the calculated size of the document that can be created at the resolution threshold falls within predetermined limits (step 460). The predetermined limits can be determined by examining the parameters of the handheld device 220. The predetermined limits can include size limits related to storage constraints or display time constraints.

If the document size of a document that can be created at the resolution threshold is not within the predetermined limits (the 'NO' branch of step 460), the color space of the map 300 is reduced (step 470). By reducing the number of colors in the color space of the map, the number of bits required to store color information for each pixel in the rendered image of the map is also reduced. Color reduction can include reducing the number of indexed colors, such as reducing 32 bit colors to 24 bit colors, 24 bit colors to 12 bit colors, 12 bit colors to 8 bit colors. Color reduction can also include reducing indexed colors to shades of gray, such as by reducing colors from 8 bit indexed colors to 8 bit shades of gray. Shades of gray can also be reduced from one set of shades of gray to a second set of shades of gray, such as by reducing from 8 bit shades of gray to 4 bit shades of gray. Shades of gray can be reduced to black and white. After reducing the color space of the electronic document, the method returns to step 450, where the document size of a document that can be created at the resolution threshold is recalculated with the reduced colors at the resolution threshold and compared again to the predetermined limits to determine if the predetermined limits have been met. Steps 450, 460 and 470 can be repeated until the predetermined limits have been met (the 'YES' branch of step 460).

If the predetermined limits are met by the document size of a document to be configured at the resolution threshold (the 'YES' branch of step 460), the document is configured at the resolution threshold (step 480). The image can be created as a raster image and downloaded to the handheld device 220. The spatial relationships between the text information 310 and other elements of the map 300 are thus preserved.

In one implementation, if the predetermined limits are not met using the smallest font size to determine resolution threshold, the method of FIG. 4 can be repeated using the next smallest font size as the minimum legible font.

The invention can be implemented in digital electronic circuitry, or in computer hardware, firmware, software, or in combinations of them. Apparatus of the invention can be implemented in a computer program product tangibly embodied in a machine-legible storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, steps of the invention can be performed in a different order and still achieve desirable results. Also, the method can be used for storage or display of images in other devices such as a digital camera. Different values within information types can be given higher priority. For example, for color information, lighter colors can be a high priority element type if the method will be used in association with a dark environment (e.g., if a camera is being used at night).

What is claimed is:

1. A method comprising:
    acquiring an electronic document, the electronic document including text objects each having a respective font size;
    identifying a smallest font size of the text objects in the electronic document;
    receiving parameters of display device, the parameters comprising a display resolution;
    determining a resolution threshold for the entire electronic document such that a text object of the text objects having the identified smallest font size in the acquired electronic document would be legible on the display device according to the display resolution of the display device;
    determining a document size limit for the display device;
    determining a document size for a raster image that would be created by rasterizing the electronic document at the resolution threshold and using a number of bits for storing color information for each pixel in the raster image;
    determining that the document size is not within the document size limit for the display device and then repeatedly reducing a color space for the electronic document wherein the number of bits used for storing color information for each pixel are reduced until the document is within the document size limit for the display device, and wherein the respective font sizes of the text objects relative to the entire electronic document are preserved;
    rasterizing the electronic document, for display on the display device, at the resolution threshold and using the reduced color space and reduced number of bits for storing color information.

2. The method of claim 1, wherein the resolution threshold is calculated according to the formula dDPI=sDPI×dFontSize/sFontSize where dDPI is the resolution threshold, sDPI is a standard resolution of the electronic document, dFontSize is the size of a standard font size in a first device, and sFontSize is the smallest font size of the one or more text objects in the electronic document.

3. The method of claim 2, wherein sDPI is a standard resolution of a computer monitor.

4. The method of claim 1, where the smallest font size of the text objects in the electronic document is designated as a high priority information type and where the number of bits used to store color information is designated as a low priority information type.

5. A computer program product, tangibly stored on a computer-legible medium, for configuring an electronic document for a presentation environment, the product comprising instructions operable to cause a computer system to:
    acquire an electronic document, the electronic document including text objects each having a respective font size;
    identify a smallest font size of the text objects in the electronic document;
    receive parameters of a display device, the parameters comprising a display resolution;
    determine a resolution threshold for the entire electronic document such that a text object of the text objects having the identified smallest font size in the acquired electronic document would be legible on the display device according to the display resolution of the display device;
    determine a document size limit for the display device;
    determine a document size for a raster image that would be created by rasterizing the electronic document at the resolution threshold and using a number of bits for storing color information for each pixel in the raster image;
    determine that the document size is not within the document size limit for the display device and then repeatedly reduce a color space for the electronic document wherein the number of bits used for storing color information for each pixel are reduced until the document size is within the document size limit for the display device, and wherein the respective font sizes of the text objects relative to the entire document are preserved; and
    rasterizing the electronic document, for display on the display device, at the resolution threshold and using the reduced color space and reduced number of bits for storing color information.

6. The computer program product of claim 5, wherein the resolution threshold is calculated according to the formula dDPI=sDPI×dFontSize/sFontSize where dDPI is the resolution threshold, sDPI is a standard resolution of the electronic document, dFontSize is the size of a standard font size in a first device, and sFontSize is the smallest font size of the one or more text objects in the electronic document.

7. The computer program product of claim 6, wherein sDPI is a standard resolution of a computer monitor.

8. The computer program product of claim 5, where the smallest font size of the text objects in the electronic document is designated as a high priority information type and where the number of bits used to store color information is designated as a low priority information type.

9. A system comprising:
    one or more processors;
    memory coupled to the one or more processors and operable for storing instructions which, when executed by the one or more processors, cause the one or more processors to perform operations comprising:
    acquiring an electronic document, the electronic document including text objects each having a respective font size;
    identifying a smallest font size of the text objects in the electronic document;

receiving parameters of a display device, the parameters comprising a display resolution;

determining a resolution threshold for the entire electronic document such that a text object of the text objects having the identified smallest font size in the acquired electronic document would be legible on the display device according to the display resolution of the display device;

determining a document size limit for the display device;

determining a document size for a raster image that would be created by rasterizing the electronic document at the resolution threshold and using a number of bits for storing color information for each pixel in the raster image;

determining that the document size is not within the document size limit for the display device and then repeatedly reducing a color space for the electronic document wherein the number of bits used for storing color information for each pixel are reduced until the document size is within the document size limit for the display device, and wherein the respective font sizes of the text objects relative to the entire electronic document are preserved; and rasterizing the electronic document, for display on the display device, at the resolution threshold and using the reduced color space and reduced number of bits for storing color information.

10. The system of claim 9, wherein the resolution threshold is calculated according to the formula $$dDPI = sDPI \times dFontSize / sFontSize$$

where dDPI is the resolution threshold, sDPI is a standard resolution of the electronic document, dFontSize is the size of a standard font size in a first device, and sFontSize is the smallest font size of the one or more text objects in the electronic document.

11. The system of claim 10, wherein sDPI is a standard resolution of a computer monitor.

12. The system of claim 9, where the smallest font size of the text objects in the electronic document is designated as a high priority information type and where the number of bits used to store color information is designated as a low priority information type.

* * * * *

UNITED STATES PATENT AND TRADEMARK OFFICE
CERTIFICATE OF CORRECTION

| | | |
|---|---|---|
| PATENT NO. | : 7,895,513 B1 | Page 1 of 1 |
| APPLICATION NO. | : 10/447718 | |
| DATED | : February 22, 2011 | |
| INVENTOR(S) | : Atul K. Puri et al. | |

It is certified that error appears in the above-identified patent and that said Letters Patent is hereby corrected as shown below:

On the title page, item [54] and col. 2, line 5, delete "Cirsuits" and insert -- Circuits --.

In Claim 1, column 9, line 33 (approx.), after "of" insert -- a --.

In Claim 1, column 9, line 51, after "document" insert -- size --.

In Claim 1, column 9, line 54, after "preserved" insert -- and --.

In Claim 11, column 10, line 36, after "entire" insert -- electronic --.

Signed and Sealed this
Twenty-sixth Day of July, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,895,513 B1 | Page 1 of 1 |
| APPLICATION NO. | : 10/447718 | |
| DATED | : February 22, 2011 | |
| INVENTOR(S) | : Atul K. Puri et al. | |

It is certified that error appears in the above-identified patent and that said Letters Patent is hereby corrected as shown below:

Title Page, Item (56) References Cited, OTHER PUBLICATIONS, "Sugita, Hiroaki, et al." reference, line 3, delete "Cirsuits" and insert -- Circuits --.

In Claim 1, column 9, line 33 (approx.), after "of" insert -- a --.

In Claim 1, column 9, line 51, after "document" insert -- size --.

In Claim 1, column 9, line 54, after "preserved" insert -- and --.

In Claim 11, column 10, line 36, after "entire" insert -- electronic --.

This certificate supersedes the Certificate of Correction issued July 26, 2011.

Signed and Sealed this
Twenty-third Day of August, 2011

David J. Kappos
*Director of the United States Patent and Trademark Office*